(12) United States Patent
Sun et al.

(10) Patent No.: US 6,678,389 B1
(45) Date of Patent: Jan. 13, 2004

(54) METHOD AND APPARATUS FOR EMBEDDING DIGITAL INFORMATION IN DIGITAL MULTIMEDIA DATA

(75) Inventors: Qibin Sun, Singapore (SG); Jiankang Wu, Singapore (SG); Huijie Robert Deng, Singapore (SG)

(73) Assignee: Kent Ridge Digital Labs (SG)

( * ) Notice: Subject to any disclaimer, the term of this patent is extended or adjusted under 35 U.S.C. 154(b) by 0 days.

(21) Appl. No.: 09/445,142

(22) PCT Filed: Dec. 29, 1998

(86) PCT No.: PCT/SG98/00110
§ 371 (c)(1),
(2), (4) Date: Dec. 2, 1999

(87) PCT Pub. No.: WO00/39954
PCT Pub. Date: Jul. 6, 2000

(51) Int. Cl.[7] .................................................. G06K 9/00
(52) U.S. Cl. ...................................................... 382/100
(58) Field of Search ........................... 382/100; 375/130, 375/142; 348/475; 235/494

(56) References Cited

U.S. PATENT DOCUMENTS

| | | | |
|---|---|---|---|
| 4,910,716 A | 3/1990 | Kirlin et al. ................... 367/24 |
| 5,109,451 A | 4/1992 | Aono et al. .................... 382/56 |
| 5,212,742 A | 5/1993 | Normile et al. ................ 382/56 |
| 5,530,759 A | 6/1996 | Braudaway et al. ........... 380/54 |
| 5,613,004 A | 3/1997 | Cooperman et al. .......... 380/28 |
| 5,636,292 A | 6/1997 | Rhoads ........................ 382/232 |
| 5,646,997 A | 7/1997 | Barton .......................... 380/23 |
| 5,657,390 A | 8/1997 | Elgamal et al. ............... 380/49 |
| 5,659,726 A | 8/1997 | Sandford, II et al. ........ 395/612 |
| 5,664,018 A | 9/1997 | Leighton ...................... 380/54 |
| 5,687,191 A | 11/1997 | Lee et al. .................... 375/216 |
| 5,687,236 A | 11/1997 | Moskowitz et al. .......... 380/28 |
| 5,689,587 A | 11/1997 | Bender et al. ............... 382/232 |
| 5,710,834 A | 1/1998 | Rhoads ........................ 382/232 |
| 5,721,788 A | 2/1998 | Powell et al. ................ 382/100 |
| 5,734,752 A | 3/1998 | Knox ........................... 382/212 |
| 5,748,763 A | 5/1998 | Rhoads ........................ 382/115 |
| 5,809,139 A | 9/1998 | Girod et al. ..................... 380/5 |
| 6,201,879 B1 * | 3/2001 | Bender et al. ............... 382/100 |
| 6,226,387 B1 * | 5/2001 | Tewfik et al. ................ 382/100 |
| 6,240,121 B1 * | 5/2001 | Senoh .......................... 375/130 |
| 6,301,368 B1 * | 10/2001 | Bolle et al. .................. 382/100 |

FOREIGN PATENT DOCUMENTS

| | | |
|---|---|---|
| EP | 0766468 | 4/1997 |
| EP | 0859337 | 8/1998 |
| EP | 0962886 | 12/1999 |

OTHER PUBLICATIONS

Wolfram Szepanski, "A signal theoretic method for creating forgery proof documents for automatic verification", 1979 Carnahan on Crime Countermeasures, pp. 101–109.*

(List continued on next page.)

Primary Examiner—Leo Boudreau
Assistant Examiner—Tom Y. Lu
(74) Attorney, Agent, or Firm—Ladas & Parry

(57) ABSTRACT

A steganographic method is disclosed to embed an invisible watermark into an image. It can be used for copyright protection, content authentication or content annotation. The technique is mainly based on K-L transform. Firstly a block and cluster step 106 and cluster selection step 108 are performed to enhance the optimization of K-L transform 110 for a given image. Then a watermark is embedded 114 into the selected eigen-clusters. ECC (Error Correction Code) can be employed to reduce the embedded code error rate. The proposed method is characterized by robustness despite the degradation or modification on the watermarked content. Furthermore, the method can be extended to video, audio or other multimedia especially for multimedia databases in which the stored multimedia are categorized by their contents or classes.

72 Claims, 8 Drawing Sheets

OTHER PUBLICATIONS

Carevic, D et al. "Region–Based Coding of Color Images Using Karhunen–Loeve Transform", Graphical Models and Image Processing, vol. 59, No. 1 pp. 27–38, (1997).

Craver, S et al. "Can Invisible Watermarks Resolve Rightful Ownerships?", Technical Report RC, 20509, SPIE, vol. 3022, pp. 310–321 (1996).

Petitcolas, Fabien A.P. et al. " Attacks on Copyright Marking systems". IEEE Workshop on Information Hiding, pp. 218–238, (1998).

Jain, Anil K. "Fundamentals of Digital Image Processing" Prentice Hall, pp. 163–175 (1986).

Torres, L et al. "Video Coding". Kluwer Academic Publishers, pp. 411–417, (1996).

Turk, M et al. "Eigenfaces for Recognition" Journal of Cognitive Neuroscience, vol. 3, No. 1, pp 71–86, (1991).

Chou, C.H. et al. "A perceptually tuned sub–band imgae coder based on the measure of Just–Noticeable–Distortion profile". IEEE Trans. on Circuits and Systems for Video Technology, vol. 5, No. 6, pp 467–476, (1995).

Flusser, J. "An adaptive method for image registration", Pattern Recognition, vol. 25, No. 1, pp 45–54, (1992).

* cited by examiner

METHOD AND APPARATUS FOR EMBEDDING DIGITAL INFORMATION IN DIGITAL MULTIMEDIA DATA

FIELD OF INVENTION

The present invention relates to a method and apparatus for embedding digital information in digital multimedia data. The invention also relates to a computer program product including a computer readable medium having recorded thereon a computer program for embedding digital information in digital multimedia data.

BACKGROUND OF INVENTION

Over recent decades there has been a rapid growth in computers and digital communications networks. With this growth, the illegal distribution, duplication and the manipulation of digital or digitised multimedia content have become more and more common place. Even though such activity may violate copyright laws, it is still widespread. There is thus a need to protect the rights of owners who own these original multimedia data.

Similarly, there has also been a proliferation of exchange of sensitive data over public communications networks. Recently, digital signatures have been used to verify and authenticate the integrity of such data and identity the sender of the data. However there exists a need for invisible digital signature for images, which adequately represents the content of the images and further can be used for verifying whether the signed images have been modified.

In addition, there has been an associated growth in multimedia databases. Usually the stored multimedia data needs to be annotated (captioning). If the annotation can be associated with the content permanently, it will be convenient and safe for some applications such as medical image database.

Digital watermarking techniques can be applied to the above-mentioned applications, namely, for copyright protection, multimedia content authentication and multimedia content annotation. Although visible watermarks have been previously used, there is much promise for invisible digital watermarking techniques due to its unobtrusive nature. Regardless of particular applications, the following are the basic and common requirements for invisible watermarks. The watermark should be unobtrusive and not annoying to bona-fide users. The watermark scheme should be robust to some reasonable distortions during storage and transmission (such as compression, noise addition, format conversion, and bit errors). The watermark scheme should also be robust to some artifacts caused by signal processing operations (such as noise reduction, filtering, sharpening, and colour & intensity variations) It should also be secure against typical attacks such as colluding pirates who combine multiple versions of the same multimedia content that are stamped with different watermarks. Erasing the watermark or replacing the watermark by another watermark should be technically difficult.

Although these requirements are essential to practical applications, so far no one method or system is capable of fully satisfying the above conditions due to its so many unsolved problems and challenges.

ASPECTS OF INVENTION

It is an object of the present invention to ameliorate one or more disadvantages of the prior art.

According to one aspect of the invention, there is provided a method of embedding digital information in digital multimedia data, wherein said method includes the following steps: generating one or more transforms from the digital multimedia data or a portion of the digital multimedia data, wherein said transforms are dependent on the digital multimedia data or the portion of the digital multimedia data; generating transformed digital multimedia data by applying the one or more transforms to the digital multimedia data or the portion of the digital multimedia data; embedding the digital information in the transformed digital multimedia data; and generating the digital multimedia data embedded with the digital information by applying one or more inverse transforms of the one or more transforms to the embedded transformed digital multimedia data.

According to still another aspect of the invention, there is provided a method of embedding digital information in digital multimedia data, wherein said method includes the following steps: generating one or more transforms from the digital multimedia data or a portion of the digital multimedia data, wherein said transforms are dependent on the digital multimedia data or the portion of the digital multimedia data; generating transformed digital multimedia data by applying the one or more transforms to the digital multimedia data or the portion of the digital multimedia data; embedding the digital information in the one or more transforms or their inverses; and generating the digital multimedia data embedded with the digital information by applying one or more embedded inverse transforms to the transformed digital multimedia data.

According to still another aspect of the invention, there is provided a method of embedding digital information in a digital image, wherein said method includes the following steps: partitioning the image into blocks of pixels; clustering the partitioned blocks into classes according to a homogeneity criteria; selecting one or more of the clusters in accordance with HVS analysis; generating an associated Karhunen-Loeve (K-L) transform for each selected cluster, wherein the image blocks of each selected cluster are used as a vector population for the purposes of generating the associated K-L transform; applying the associated K-L transform to the image blocks of the selected cluster to produce corresponding transformed image blocks; embedding, for each selected cluster, the digital information in the associated K-L transform; and applying, for each selected cluster, an inverse transform of the embedded associated K-L transform to the transformed image blocks of the selected cluster.

According to still another aspect of the invention, there is provided a method of embedding digital information in a digital image, wherein said method includes the following steps: partitioning the image into blocks of pixels; clustering the partitioned blocks into classes according to a homogeneity criteria; selecting one or more of the clusters in accordance with HVS analysis; generating an associated Karhunen-Loeve (K-L) transform for each selected cluster, wherein the image blocks of each selected cluster are used as a vector population for the purposes of generating the associated K-L transform; applying the associated K-L transform to the image blocks of the selected cluster to produce corresponding transformed image blocks; embedding, for each selected cluster, the digital information in the selected transformed image blocks; applying, for each selected cluster, an inverse transform of the associated K-L transform to the embedded transform image blocks of the selected cluster.

According to still another aspect of the invention, there is provided a method of embedding digital information in a digital image, wherein said method includes the following steps: partitioning the image into blocks of pixels; clustering the partitioned blocks into classes according to a homogeneity criteria; selecting one or more of the clusters in accordance with HVS analysis; generating an associated Karhunen-Loeve (K-L) transform for each selected cluster, wherein the image blocks of each selected cluster are used as a vector population for the purposes of generating the associated K-L transform; applying the associated K-L transform to the image blocks of the selected cluster to produce corresponding transformed image blocks; selecting, for each selected cluster, either the associated K-L transform or its corresponding transformed image blocks for embedding; embedding, for each selected cluster, the digital information in the selected K-L transform or the selected transformed image blocks; applying, for those selected clusters in which the digital information has been embedded in the associated K-L transform, an inverse transform of the embedded associated K-L transform to the transformed image blocks of the selected cluster; and applying, for those selected clusters in which the digital information has been embedded in the transformed image blocks, an inverse transform of the associated K-L transform to the embedded transform image blocks of the selected cluster.

According to still another aspect of the invention, there is provided a method of embedding digital information in a plurality of images, wherein the images are stored and classified into one or more classes and said method includes the following steps: generating one or more transforms from the images of said respective one or more classes, wherein said transforms are dependent on the images; generating transformed images by applying the one or more transforms to the images of said respective one or more classes; embedding the digital information in the transformed images; and generating the images data embedded with the digital information by applying one or more inverse transforms of the one or more transforms to the embedded transformed images.

According to still another aspect of the invention, there is provided a method of embedding digital information in a plurality of images, wherein the images are stored and classified into one or more classes and said method includes the following steps: generating one or more transforms from the images of said respective one or more classes, wherein said transforms are dependent on the images; generating transformed images by applying the one or more transforms to the images of said respective one or more classes; embedding the digital information in the one or more transforms or their inverses; and generating the images embedded with the digital information by applying one or more embedded inverse transforms to the transformed images.

According to still another aspect of the invention, there is provided a method of embedding digital information into video images including a plurality of frames, wherein said method includes the following steps: extracting one or more key frames from the video images; generating one or more transforms from the key frames or a part thereof, wherein said transforms are dependent on the key frames or the part thereof; generating transformed key frames or part thereof by applying the one or more transforms to the key frames or the part thereof; embedding the digital information in the transformed key frames or part thereof; and generating the key frames or part thereof embedded with the digital information by applying one or more inverse transforms of the one or more transforms to the embedded key frames or part thereof.

According to still another aspect of the invention, there is provided a method of embedding digital information into video images including a plurality of frames, wherein said method includes the following steps: extracting one or more key frames from the video images; generating one or more transforms from the key frames or a part thereof, wherein said transforms are dependent on the key frames or the part thereof; generating transformed key frames or part thereof by applying the one or more transforms to the key frames or the part thereof; embedding the digital information in the one or more transforms or their inverses; and generating the key frames or part thereof embedded with the digital information by applying one or more embedded inverse transforms to the transformed key frames or part thereof.

According to still another aspect of the invention, there is provided a method of registering an image, wherein the method includes the following steps: extracting key points from the image and their invariant attributes; extracting other global information from the image; aligning the extracted key points and their invariant attributes with the global information; and encrypting the aligned information to provide an image signature.

According to still another aspect of the invention, there is provided a method of modifying a first image in accordance with an image signature, wherein the image signature includes encrypted key points of a second image and their invariant attributes and other aligned global information of the second image and the method includes the steps of: decrypting the image signature to obtain the key points and their invariant attributes and other global information of the second image; extracting key points and their invariant attributes from the first image; extracting other global information from the first image; matching the key points and their invariant attributes and other global information of the first and second images; and normalising the first image based on said matched key points and their invariant attributes and other global information.

According to still another aspect of the invention, there is provided a method of extracting digital information from first digital multimedia data having embedded therein said digital information, wherein said method includes the following steps: deriving one or more embedded transforms from a reference file, wherein said embedded transforms are dependent on second digital multimedia data or a portion thereof; deriving transformed digital multimedia data from the reference file, wherein said transformed digital multimedia data is dependent on the second digital multimedia data or a portion thereof; generating transformed digital multimedia data by applying one or more of the derived embedded transforms to the first digital multimedia data or a portion thereof; and correlating the generated transformed digital multimedia with the derived transformed digital multimedia to check whether the digital information embedded in the first multimedia data is the same as that derived from the reference file.

According to still another aspect of the invention, there is provided a method of extracting digital information from first digital multimedia data having embedded therein said digital information, wherein said method includes the following steps: deriving one or more transforms from a reference file, wherein said transforms are dependent on second digital multimedia data or a portion thereof; deriving transformed digital multimedia data from the reference file, wherein said transformed digital multimedia data is dependent on the second digital multimedia data or a portion thereof; generating embedded transformed digital multimedia data by applying one or more of the derived embedded transforms to the first digital multimedia data or a portion thereof; and correlating the generated embedded transformed digital multimedia with the derived transformed digital multimedia so as to extract the digital information.

According to still another aspect of the invention, there is provided a method of embedding digital information in a digital image, wherein said method includes the following steps: partitioning the image into blocks of pixels; clustering the partitioned blocks into classes according to a homogeneity criteria; selecting one or more of the clusters in accordance with HVS analysis; averaging, for each selected cluster, the blocks of pixels; embedding, for each selected cluster, the digital information in the averaged blocks; and replacing, for each selected cluster, the blocks with the embedded averaged block for that cluster.

According to still another aspect of the invention, there is provided a method of extracting digital information from an image having embedded therein said digital information, wherein said method includes; partitioning the image into blocks of pixels; clustering the partitioned blocks into classes according to a homogeneity criteria; selecting one or more of the clusters in accordance with information obtained from a reference file; retrieving, for each selected cluster, an average block of pixels stored in the reference file; averaging, for each selected cluster, the blocks of pixels of the image; and correlating, for each selected pixel, the averaged blocks of the image with the retrieved blocks to determine whether a watermark exists.

According to still another aspect of the invention, there is provided an apparatus for implementing any one of the aforementioned methods.

According to still another aspect of the invention there is provided a computer program product including a computer readable medium having recorded thereon a computer program for implementing any one of the methods described above.

BRIEF DESCRIPTION OF THE DRAWINGS

Embodiments of the invention are described with reference to the drawings, in which.

DETAILED DESCRIPTION

The principles of the preferred method described herein have general applicability to a method of embedding a digital message within digital multimedia content. However, for ease of explanation, the steps of the preferred method are described with reference to a method of embedding a watermark within a still digital image. Though, it is not intended that the present invention be limited to the latter method. For example, the invention may have application to embedding an identification message within other multimedia content such as video, audio, print or film. The embedded identification message can also be used for copyright protection, content authentication and content annotation without departing from the scope and spirit of the invention.

First Preferred Embodiment(s)

Figure 1:
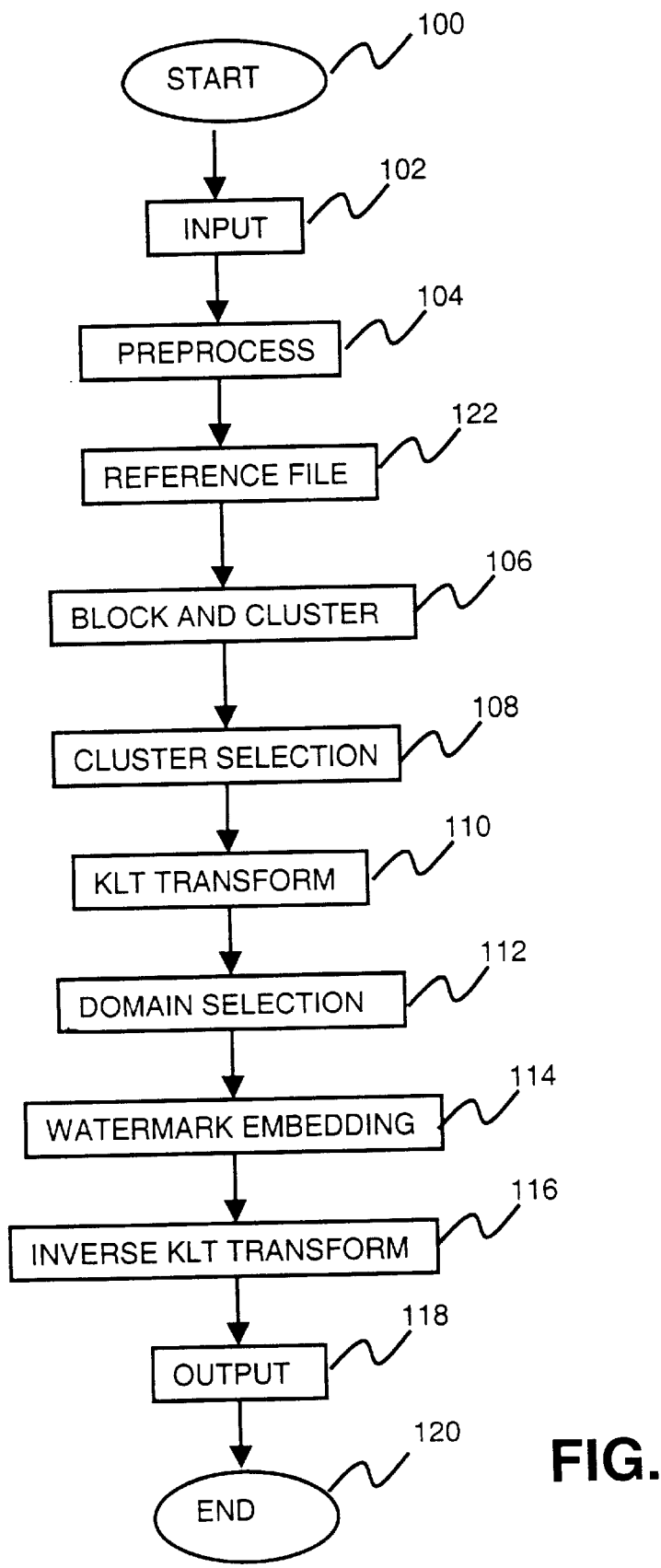
FIG. 1 is a flow diagram of a method of embedding a watermark in a digital image in accordance with a preferred embodiment.

FIG. 1 is a flow diagram of a method of embedding a watermark in a digital image according to a preferred embodiment. The method commences at step 100 and any necessary initialisation processes are undertaken. In the next step 102, an original digital image is input by a user for processing. The original digital image is a pixel-map representation which includes a numerical representation of the particular colour for each pixel location in a rectangular array. Any numerical representation of colour can be used and can be expressed as a sequence of one or more numbers. Also, other information may be input at this stage, such as header information. Such header information can include the size of the image, resolution etc.

The input original image is then preprocessed in step 104. The preprocessing may take the form of filtering, noise estimation and so on. After the preprocessing step 104, the method continues with a block and clustering step 106.

In the block and clustering step 106, the selected original image is divided into N non-overlapping blocks of size nxn. Preferably, these blocks are either 4×4 pixels or 8×8 pixels in size. In the event the original image is not a multiple of the image block size, a portion of the original image which is a multiple can be used by the method and the remaining portion disregarded. The block and cluster step 106 allocates these image blocks to clusters (sometimes known as classes) according to the details of the image block content and a homogeneity criteria. Thus the image blocks within each cluster will have similar amount of and type of content. Preferably, the clusters are classified according to their complexity or texture content. This classification is achieved in the following manner. Firstly, feature measures are extracted from each image block which are representative of the complexity of the content. Some preferred feature measures are grey scale, colour variation or texture measures. Afterwards, the clustering process classifies the image blocks according to their feature measures. The clustering process preferably utilises the k-means clustering method. Alternatively, the preferred method can use region growing, or split-merge clustering processes. In this way, the block and clustering step allocates the image blocks to a plurality of clusters. After the block and clustering step 106 is completed, the processing continues at step 108.

In step 108, a cluster selection process is undertaken. In this selection process, an analysis based on the Human Vision System (HVS) is applied to all clusters to determine whether and by how much the watermark can be embedded. Preferably, those clusters which satisfy the HVS requirements are selected for watermark embedding. The perceptual redundancies inherent in a still image are basically due to inconsistency in the sensitivity of the HVS to stimuli of varying levels of contrast and luminance changes in the spatial domain. Thus, by utilising the HVS model in the preferred method it is possible to embed more information while not overall affecting image quality. Or in other words, the embedded watermark information is invisible to human eyes. In the preferred method, the HVS model is used to select the clusters and the embedding strength. For example, the embedding strength is determined as a proportion of the contrast of the image content of the cluster. Preferably, the HVS model used is that described in the paper "A perceptually tuned subband image coder based on the measure of Just-Noticeable-Distortion profile" by C. H. Chou and Y. C. Li, IEEE Trans. On circuits and Systems for Video Technology, Vol. 5, No. 6, pp467–476, 1995 (herein incorporated by reference). In another embodiment, if there are a number of clusters which satisfy these HVS requirements, then one or more clusters can be selected by the user for embedding. Alternatively, different clusters can be embedded with different watermarks with the same seeds to increase the security and robustness of the watermarking. After the clusters have selected the preferred method proceeds to the next step 110.

In the next step 110, one or more Karhunen-Loeve transforms (KLT) are applied to the image blocks of one or more selected clusters. These KLT transforms are each derived from and applied to a corresponding selected cluster. It is noted that, up until today, the statistically optimum, signal-dependent transform, KLT is still believed to be impractical for image processing. This is due to the time-consuming computations needed for determining the data covariance matrix (related to eigen-vectors). However in the preferred method, this will not be a crucial problem any more. Firstly, the KLT adopted in the preferred method is the discrete KLT (also called the Principle Components Analysis) where there have been some fast implementations developed recently. Secondly, unlike image compression or image coding, for watermarking there is no need to transform all blocks or segmented regions in the images. The fast clustering processing associated with the cluster selection step 106 allows the reduction of the computational burden to an acceptable and practical level. Namely, the KLT transforms need not be applied over all the image, but only to the selected clusters.

In the step 110, a KLT transform is separately derived and applied for each cluster. Firstly, each non-overlapping block in the i th cluster (segment), i=1, $\Lambda$, N, is mapped to a d-dimensional vector $X_{ij}$, where $d=3n^2$, by sequentially scanning each location in the block and taking its corresponding tricomponent colour signals. (Note: for monochrome image, $d=n^2$). Here N denotes the total number of clusters to be transformed. Thus each block in the same cluster can be implicitly modelled as separate multivariate Gaussian Markov random fields. The sets of vectors $X_{ij}$ created in this way are assumed to have jointly zero-mean Gaussion distributions. The d×d covariance matrix $R_i$ of each such stationary zero-mean Gaussion source, i=1, $\Lambda$, N, is estimated as $$R_i = \frac{1}{M_i} \sum_{j=1}^{M_i} X_{ij} X_{ij}^T \tag{1}$$

Where $M_i$ corresponds to the number of blocks in the ith cluster. The preferred method then calculates Eigenvalues of the covariance matrix $R_i$ in accordance with $$R_i e_{ik} = \lambda_{ik} e_{ik} \tag{2}$$

Where $e_{ik}$ is the kth eigenvector (k=1, K, p)of the ith cluster and $\lambda_{ik}$ is its corresponding eigenvalue. The eigenvectors calculated from (2) are orthonormal, ie., $$e_{ik}^T e_{il} = 0 \tag{3}$$

$$e_{ik}^T e_{ik} = 1 \tag{4}$$

Subsequently, the eigenvectors are arranged such that $\lambda_{i1} \geq \lambda_{i2} \geq \Lambda \geq \lambda_{id}$ and the first $L_i$ eigenvectors, where $L_i \leq d$, can be used to form the transform matrix $A_i = [e_{i1}\ e_{i2}\ \Lambda\ e_{iL_i}]^T$, where d is the dimension of vector $X_{ij}$. Preferably however, all the eigenvectors are used to form the transform matrix, viz $L_i = d$. The reason for the latter is that the preferred method is primarily concerned with watermarking and not compression. Each vector $X_{ij}$ from the ith image cluster can then be processed by the linear transform:

$$Y_{ij} = A_i X_{ij} j = 1, K, M_i \tag{5}$$

After step 110, the preferred method proceeds to the next step 112. In step 112, a user decides whether the watermark is to be embedded in either the eigenvector domain $A_i$ or the coefficients of vectors $Y_{ij}$. Preferably, the user selects either the eigenvector domain $A_i$ or the coefficients of vectors $Y_{ij}$ for the entire image, viz for all clusters. However in another embodiment, the user is able to select the eigenvector domain $A_i$ for one cluster and the coefficients of vectors $Y_{ij}$ for another cluster. This will result in benefits in the security of the watermarking method. In a still further embodiment, the method automatically and exclusively embeds the watermark in the eigenvector domain $A_i$. Namely, the selection is automatic and no input from a user is required. Similarly, the method can automatically and exclusively embed the watermark in the coefficients of vectors $Y_{ij}$. In still further embodiment, the actual selection process is dependent on the requirements of the particular application. After step 112, the method continues processing at step 114.

In step 114, the method embeds the watermark in the selected domain, namely either the eigenvector domain $A_i$ or the coefficients of vectors $Y_{ij}$. In the event the preferred method embeds the noise-like watermark into the coefficient domain, the following embedding process is performed. A property of the coefficients of the vectors $Y_{ij}$ are that they are completely uncorrelated, as can be seen from eqn (6).

$$E[Y_{ij} Y_{ij}^T] = \begin{bmatrix} \lambda_{i1} & 0 & \Lambda & 0 \\ 0 & \lambda_{i2} & \Lambda & 0 \\ M & M & M & M \\ 0 & 0 & \Lambda & \lambda_{iL_1} \end{bmatrix} \tag{6}$$

where $\lambda_{i1} \geq \lambda_{i2} \geq \Lambda \geq \lambda_{id}$ and are the eigenvalues of the covariance matrix $R_i$. The preferred method embeds the watermark in the first $L_i$ coefficients of each vector $Y_{ij}$ where $$L_i = \arg\ \max\{\lambda_{ik_i} : \lambda_{ik} \leq D_i\} \tag{7}$$

The parameter in (7) represents the allowed distortion within the cluster. Its value will be defined for each cluster separately and decided by the results of HVS analysis. Thus during this embedding process the vectors $Y_{ij}$ are changed to $\tilde{Y}_{ij}$.

In the event the preferred method embeds the noise-like watermark into the eigenvector domain, the watermark will be embedded into the first $L_i$ eigenvectors of $A_i$ in accordance with eqn (7). Thus during this embedding process the transform $A_i$ is changed to $\tilde{A}_i$. As the eigenvectors of the transform matrix are orthogonal to each other, the generated watermark $W_i$ should be orthogonalized with respect to the eigenvectors before embedding.

In another embodiment, the transform $A_i$ may be first inverted and then embedded with the watermark.

All the parameters of the selected domain are embedded, by modulating the parameters by a noise-like watermark. This modulation is achieved in the following way $$\tilde{P} = f(P, PN(W)) \tag{8}$$

Where $f$ is a function of watermarking modulation, $\tilde{P}$ and $P$ are parameters after and before watermarking, and $PN(W)$ is generated noise-like watermark.

The content of image itself, the owner's private key of an encryption algorithm, embedding time or other information related to the owner or the buyer can be used to form the seeds of the embedded watermarks. Furthermore error correction encoding can be used to increase the robustness of the preferred method. The preferred method can use any one of a number of typical methods to embed a watermark (modulation). A simple example of such a embedding method is as follows $$\tilde{P}_i = P_i + \alpha_i P_i W_i \tag{9}$$

After the completion of the watermark embedding step 114, the process continues at step 116. In step 116, the respective inverse KLT transforms are separately applied to their respective clusters. Where the watermark has been embedded in the eigenvector domain, the "embedded" inverse KLT transform is applied to the vectors. Thus the watermarked image blocks are transformed by $$\tilde{X}_{ij} = \tilde{A}_i^{-1} Y_{ij} \; j=1, K, M_i \tag{10}$$

Where the watermark has been embedded in the coefficients of the vectors, the inverse KLT is applied to the embedded vectors. Thus the watermark image blocks are transformed by $$\tilde{X}_{ij} = A_i^{-1} \tilde{Y}_{ij} \; j=1, K, M_i \tag{11}$$

These resultant image blocks form the basis of the watermarked image. To retrieve the watermark from the watermark image or to authenticate the watermark image a reference file is needed. This reference file may be the original image itself or data based on the original image. Such data can include the size of the image, the resolution, the clusters selected and their associated KLT transform, modulation technique and owner information. Consequently, after the original image is preprocessed in step 104, the preferred method stores 122 the original image or the derived data as the reference file. In step 122, the reference file is normally held in a secure location and maybe encrypted.

After completion of inverse transform KLT 116, the preferred method continues at step 118, where the watermarked image is output. The method terminates at step 118.

The use of the KLT transform as the watermark embedding domain has the following advantages. Firstly, the KLT transform is a kind of signal-dependant transform. That means the watermark to be embedded will follow any changes of image content. Even if the watermark is the same for all different images, the real form of the embedded watermark is different. Thus in this sense, the embedded digital watermark is dependent upon the image content and can be used to authenticate an image. Furthermore, whilst the type of transform used to generate the image may be known, the original watermark cannot be defeated by inverse transforming the watermarked image data to derive the original data, since this involves the use of a different inverse transform. That is, because the watermarked data is different from the original data. Likewise, attempts to fraudulently claim ownership on image data already watermarked by the preferred method will be defeated because a different optimal transform dependent upon the watermarked image data will be involved. Still further, the KLT transform presents an extra choice to select the embedding locations either in the eigen-vector domain (basis function of KLT transform) or in the coefficient domain of KLT transform. This means that watermarking based on KLT can be done in a much secure and flexible way than other methods. In addition, the KLT transform can provide a more effective energy-compact ability more than any other transform such as DCT, DST, FFT, etc. As there is significant redundant information contained in an image, applying a KLT transform to an image means that there is more space for embedding the watermark. Also, unlike most of common watermarking schemes which only embed the watermark into the luminance channel, the KLT transform can directly & jointly process colour images. It presents a flexible way to embed a watermark directly into all colour channels. In addition, the embedded messages will persist through image modifications such as scaling, rotating, printing-rescanning, colour & intensity variation.

Figure 2:
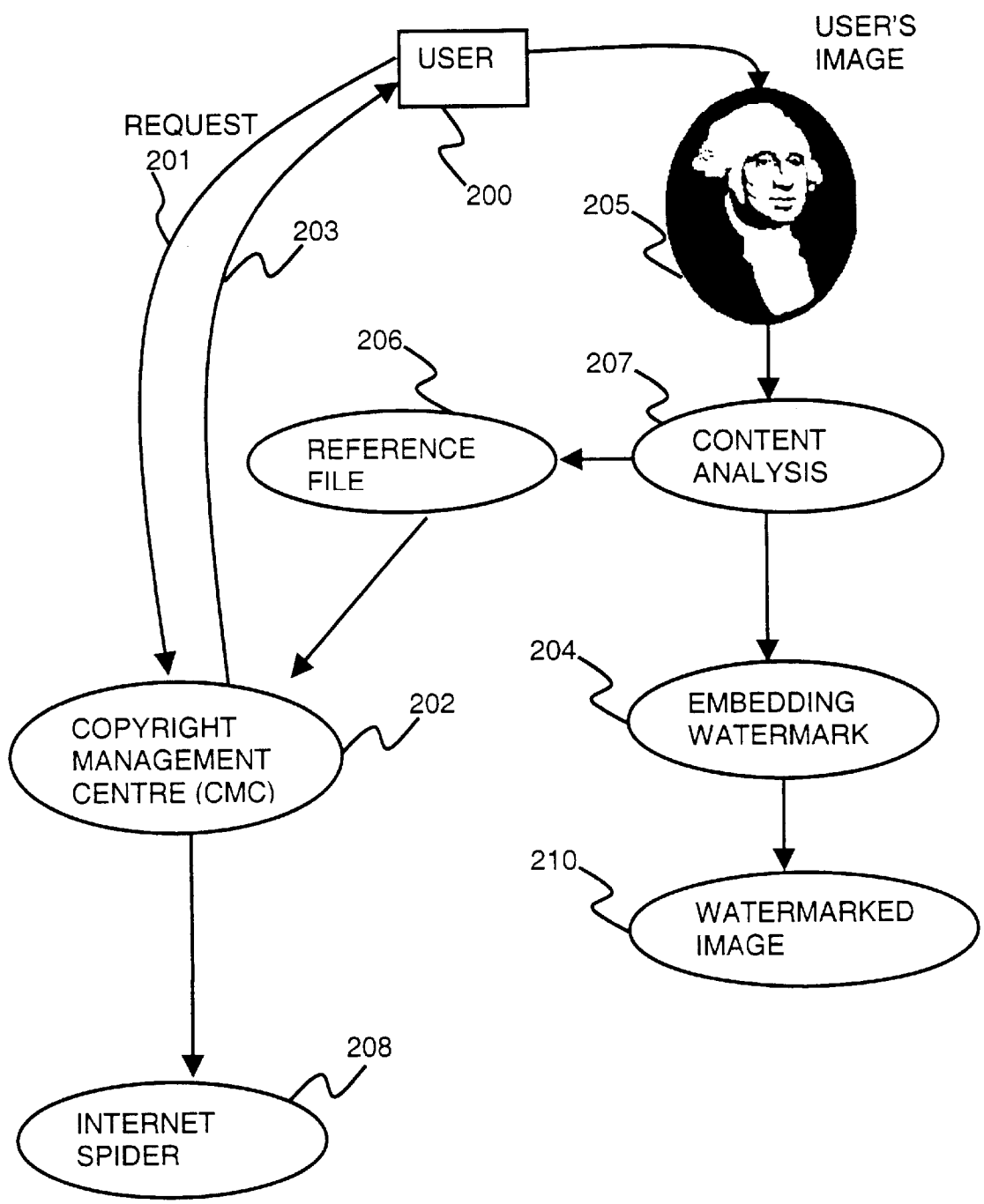
FIG. 2 shows a copyright protection system for protecting an owner's watermarked image in accordance with a preferred embodiment.

Turning now to FIG. 2 there is shown a copyright protection system for protecting an owner's watermarked image in accordance with a preferred embodiment. Firstly, the owner of the image 200 sends his request 201 to a Copyright Management Centre (CMC) 202 for registration. The CMC 202 provides the owner of the image 200 with a watermark embedding tool 203 to embed his private watermark in his images 205. During this procedure, a reference file 206 is generated and sent to CMC 202. The reference file 206 is based on a content analysis 207 of the owner's image 205. After watermarking 204, the CMC 202 will activate an Internet Spider 208 to protect the owner's watermarked images 210. Of course, there are so many variant applications related to copyright protection, content authentication and content annotation. Preferably, the watermarking engine is that described with reference to FIG. 1, namely the watermarking engine is based on KLT transforms. This watermarking engine can be constructed as a kernel and integrated into various copyright protection systems either for public use or for private use.

Figure 3:
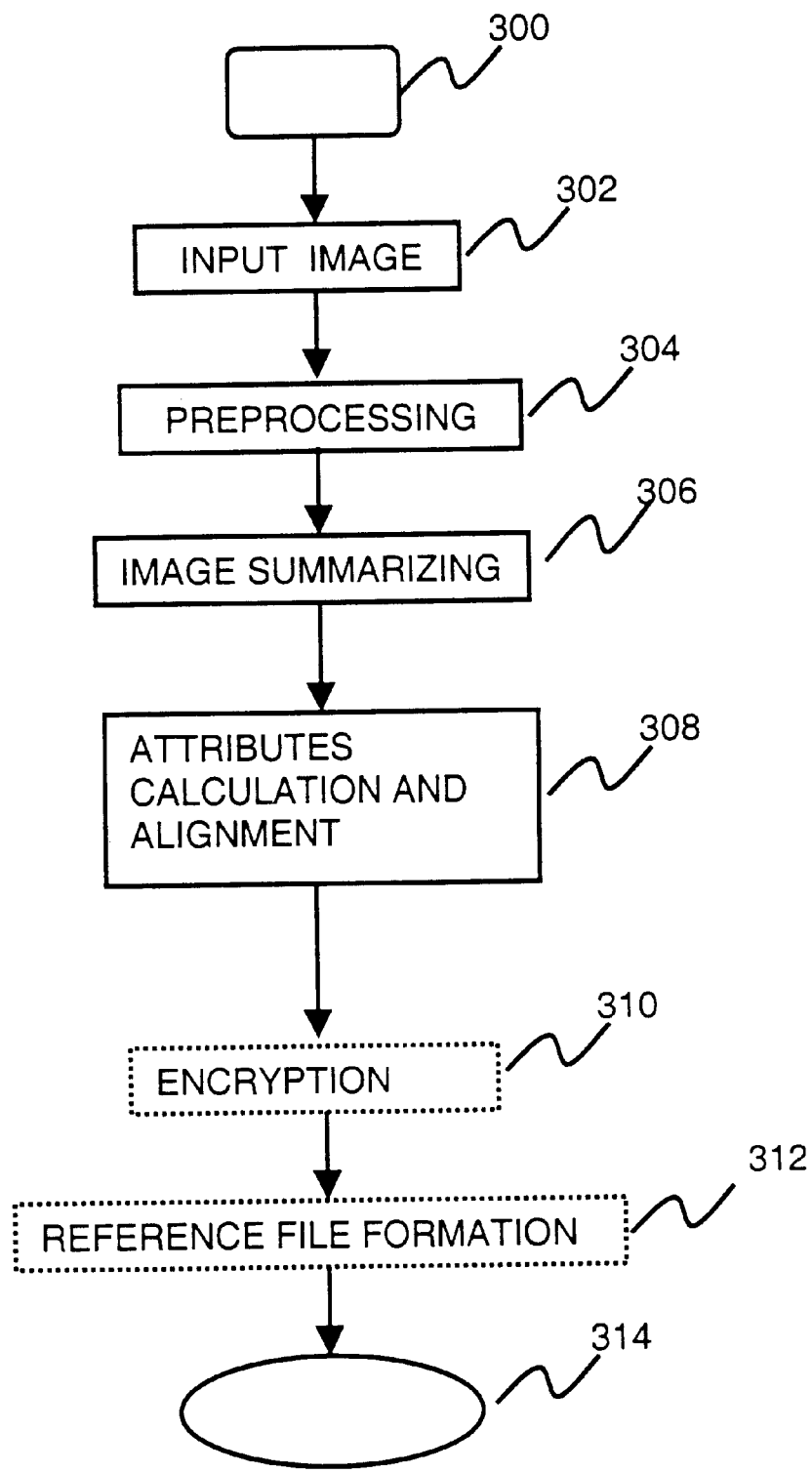
FIG. 3 is a flow diagram of a method of generating a reference file that can be used for both image registration and for image authentication in accordance with a preferred embodiment.

Turning now to FIG. 3, there is shown a flow diagram of a method of generating a reference file that can be used for both image registration and for image authentication. This method of generating a reference file may be used in the method of watermarking an image as shown in FIG. 1. The method commences at step 300 and continues at steps 302 and 304 where an image is input and preprocessed. In the next step 306, the method summarises and extracts some key points of the preprocessed image. These key points must be invariant to some typical modifications such as affine distortions, colour or intensity changes etc. Alternatively, some variations of the key points can be allowed by adopting a global affine matching algorithm in the registration procedure. Then the invariant attributes are calculated 308. These attributes are associated with other relative information such as maximum and minimum colour values, clusters and the number of clusters, and KLT transform matrices etc. Finally this associated information is encrypted by some cryptography algorithms 310 to form the reference file 312. The method terminates at step 314. In this way, the watermarked image is registered with reference to the properties of the original image, which can be used in the method of extracting the watermark from the watermarked image. Alternatively, the reference file can be used for proving whether and by how much the watermarked image has been tampered with.

Figure 4:
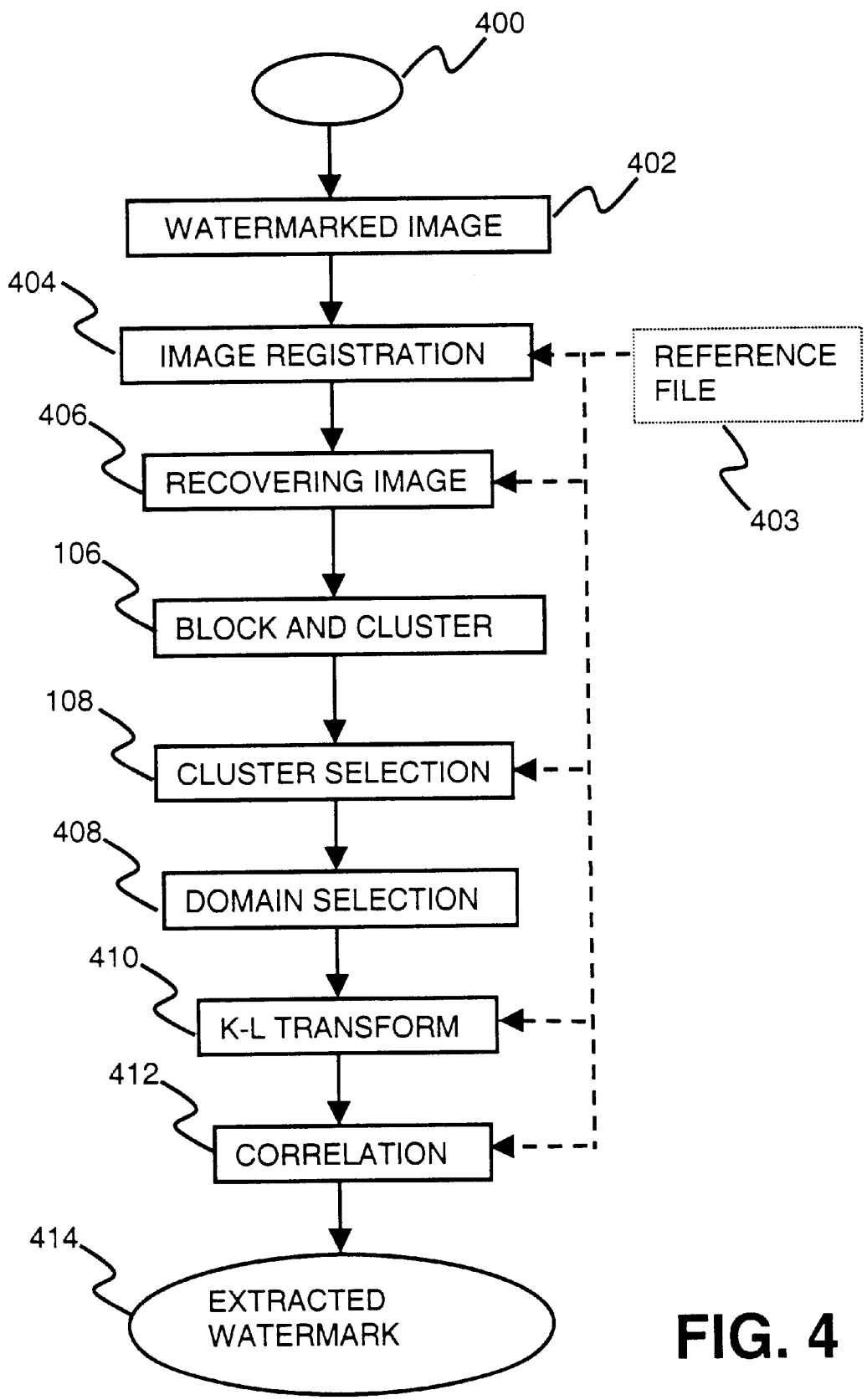
FIG. 4 is a flow diagram of a method of extracting a watermark from an image in accordance with a preferred embodiment.

Turning now to FIG. 4, there is shown of a watermark extracting method in accordance with a preferred embodiment. The method commences at step 400, where any necessary parameters are initialised. In the next step 402, a watermarked image is input by a user for watermark extraction. Afterwards in step 404, the user then inputs a reference file 403 of the original image and/or associated parameters of the type as previously described. The watermarked image is then normalised 406 based on the parameters retrieved from the reference file 403. This normalised image is partitioned into blocks 106 and then clustered 108, in a similar manner as the watermarking procedure as described with reference to FIG. 1. In step 108, any parameters necessary for the selection of the clusters are retrieved from the reference file 403. After step 108, the method continues with step 408 where the relevant domain is selected from data from the reference file. In the case where the domain selected is the coefficient domain, the next step 410 applies the transform $A_i$ to selected image blocks $\tilde{X}_{ij}$ of the test image to obtain the coefficients of vectors $\tilde{Y}_{ij}$. The images blocks $\tilde{X}_{ij}$ of the test image are decided by the reference file or owner's private key. The transform $A_i$ is also obtained from the reference file. Finally, a correlation 412 is undertaken between the last mentioned coefficients of vectors $\tilde{Y}_{ij}$ and the coefficients of vectors $Y_{ij}$ obtained from the reference file and the watermark is extracted. The extracted watermark is then compared with the watermark obtained from the reference file. In the case where the domain selected is the transform domain, the step 410 applies the embedded transform $\tilde{A}_i$ to selected image blocks $\tilde{X}_{ij}$ of the test image to obtain the coefficients $Y_{ij}$. A correlation 412 is then undertaken between the last mentioned coefficients of vectors $Y_{ij}$ and the coefficients of vectors $Y_{ij}$ obtained from the reference file so as to check whether there exists a watermark. If the coefficients are the same then the watermark is the same as was originally embedded. The extracted watermark is then output in step 418 and the method then terminates.

Figure 5:
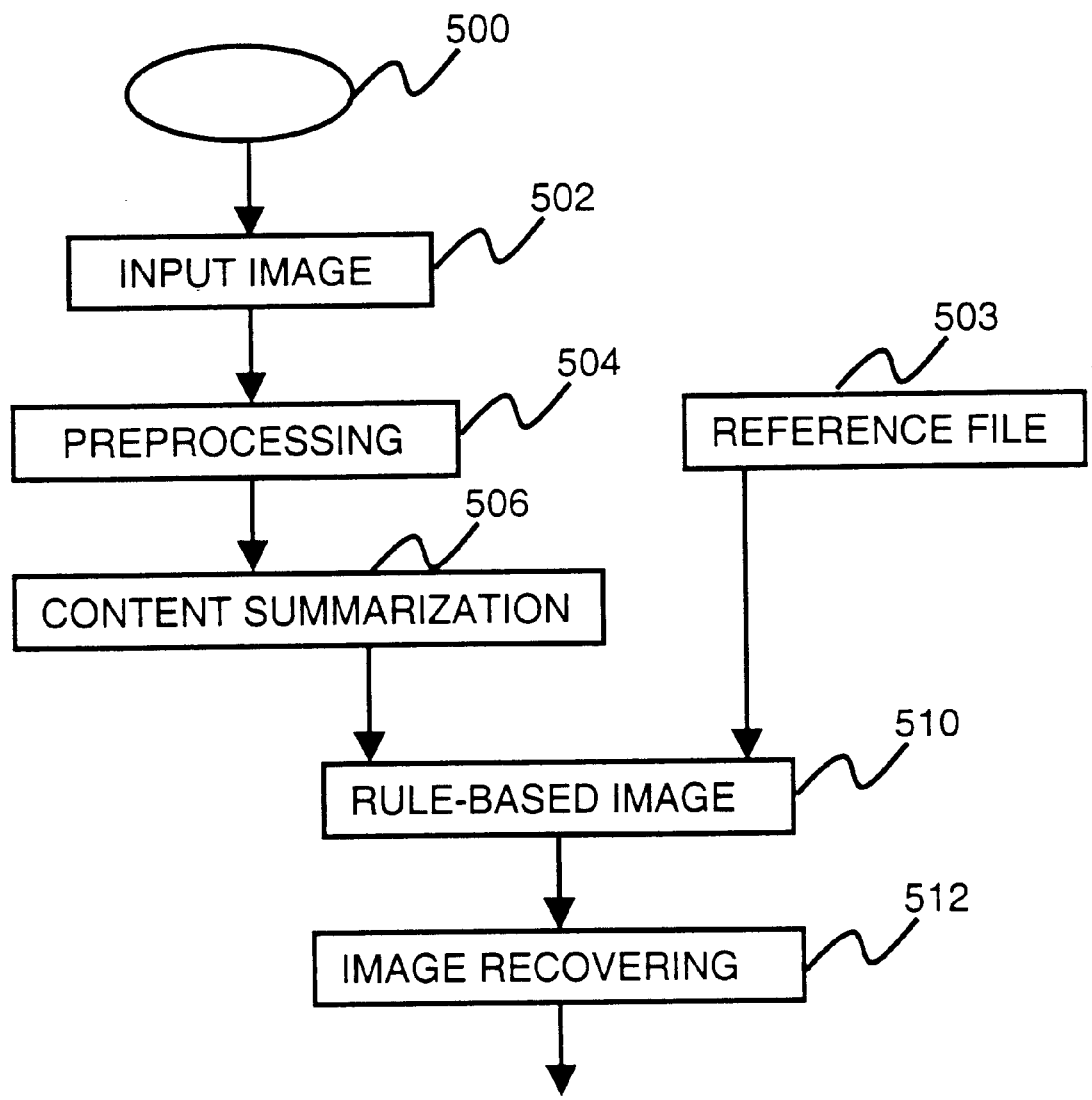
FIG. 5 shows a flow diagram of a method of registering and recovering an image for use in the extraction method shown in FIG. 4.

Turning now to FIG. 5 there is shown a flow diagram of a method of registering and recovering an image for use in the extraction method shown in FIG. 4. As a watermarked image may undergo some modifications during it's lifetime, an operation like image registration is used to estimate the modification parameters of the watermarked image. The method commences at step 500 and continues at step 502 where a watermarked image is input. The watermarked image is then preprocessed 504 and summarised 506 to obtain some key features or points. Once these key points are optimally selected, their invariant feature attributes are computed. Meanwhile relative parameters are obtained from the reference file 508 by an information recovering procedure such as decryption. Such a reference file may be obtained by a method as described with reference to FIG. 3. In the next step, a rule-based global optimal search 510 is undertaken between the obtained invariant feature attributes of the watermarked image and reference file. For example, if some feature points within a neighbour are missed, then a chopping operation may be applied onto the watermarked image. The matching is mainly based on their invariant moments of the detected feature points. Based on the estimated parameters, the watermarked image is the normalised 512 to recover an image similar to the original image. The normalisation method can be that which is described in J. Flusser, "An adaptive method for image registration", Pattern Recognition, Vol 25, No. 1, pp45–54, 1992. The method normalises the tested image by extracting the key content from the tested image, measuring the modified parameters of the tested image with reference to the reference file and then normalising the tested image with respect to these modified parameters.

The present invention is suitable for use in a number of different and widely varying applications, such as the copyright protection system as previously described. This system can provide an approach to track subsequent use of digital images and then present evidence for copyright protection, or alternatively provide a display warning users.

The present invention also can be used for content authentication. In this application, after summarising the image, the extracted key description about the image can be encrypted by the owner's private key. The buyer can then verify the authenticity of the image by using a public key. Based on the rule-based image registration method, the results of the authentication include the information about not only whether the given image is altered or not, how much it is altered, but also which kind of modification the said image undergoes. The application may also inform the owner of the images what kinds of attacks others have used on his or hers images. A digital signature may also be embedded into the image for verifying the authenticity of the content provider.

In addition, the present invention also can be used for content annotation. It is believed that the annotation done by watermarking will be helpful for multimedia database based on the current technologies.

The present invention is also particularly suitable for watermarking the images that has been stored in the multimedia database no matter what kind of applications it is used for (copyright protection, authentication and annotation). As in this case, the image will belong to some classes or categories. For example, a face database in the police station, thus a optimal basis matrix of KLT can be obtained based on the whole images from a class. The images are then embedded in a similar manner as described with reference to FIG. 1. In this way, it is very difficult for the users or the attackers to compute out the exact basis matrix. Without the exact basis matrix, it is unlikely to decode or to remove the embedded watermark.

Furthermore, the present invention can be used in relation to other media such as video and audio. For instance, in a video file, there is a strong relationship between consecutive frames. A technique called key frame extraction has been shown to be an effective approach to video indexing or summarising. By applying the KLT to hide the information directly into video file, the optimal basis matrix of the KLT can be computed out not only based the clustered blocks within each frame but also based on frames represented by the same key frame. Based on KLT, the data hiding can be implemented in a more secure and flexible way.

Second Preferred Embodiment(s)

Figure 6:
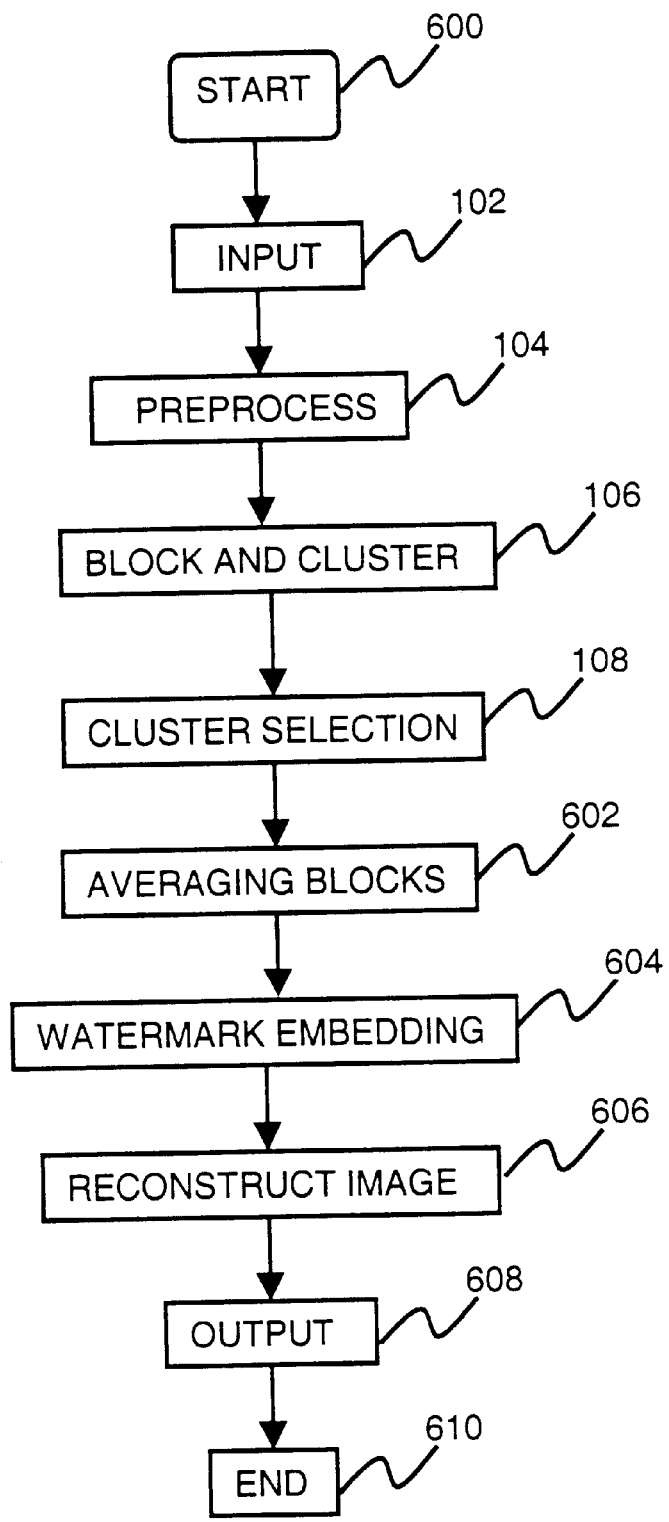
FIG. 6 is a flow diagram of a method of embedding a watermark in a digital image according to a second preferred embodiment.

FIG. 6 is a flow diagram of a method of embedding a watermark in a digital image according to a preferred embodiment. The method commences at step 100 and any necessary initialisation processes are undertaken. In the next step 102, an original digital image is input by a user for processing. The original digital image is a pixel-map representation which includes a numerical representation of the particular colour for each pixel location in a rectangular array. Any numerical representation of colour can be used and can be expressed as a sequence of one or more numbers.

Also, other information may be input at this stage, such as header information. Such header information can include the size of the image, resolution etc. Steps 102 to 108 of this method are the same as those described with reference to steps 102 to 108 of FIG. 1 and will not be described further.

In step 602 of the method, the image blocks of each cluster i are averaged. These averaged blocks are each then embedded 604 with a watermark. An average (mean) block for $M_i$ image blocks $B_{ij}$ (j=1,2, ... M) that belong to cluster i is determined by $$\overline{B}_i = \frac{1}{M_i} \sum_{j=1}^{M_i} B_{ij} \quad (12)$$

and a difference block is obtained by $$X_{ij} = B_{ij} - \overline{B}_i \quad (13)$$

The average block can be used to embed the watermark if it satisfies the HVS condition. If there are more than one suitable clusters then the user can select the cluster used for embedding. The averaging and embedding process is described in more detail below with reference to the following alternative embodiments.

In the first embodiment, the embedding is achieved by an orthogonalization process. Firstly, the average mean block $\overline{B}_i$ is aligned as a (n×n)×1 vector. This averaged mean block $\overline{B}_i$ is saved to a reference file for subsequent watermark extraction. The initial watermark $W_i$ then is orthogonalized with respect to $\overline{B}_i$ to obtain the final watermark $W_f$ in accordance with the following:

$$W_f = W_i - (W_i \cdot \breve{B}_i) \breve{B}_i \quad (14)$$

where $\breve{B}_i$ is the unit vector along $\overline{B}_i$.
Next, a smaller scaled version of W is added back to $\overline{B}_i$ to obtain a watermarked average block $\widetilde{B}_i$ in accordance with the following:

$$\widetilde{B}_i = \overline{B}_i + c W_f, \text{ where } c \text{ is a small constant to control the strength of the watermark.} \quad (15)$$

Finally in step 606, all the image blocks of the cluster are replaced with the watermarked average block $\widetilde{B}_i$ to reconstruct a new image (watermarked image). The cluster criteria is chosen (108) so that the distortion caused by replacing all the image blocks within the cluster with the watermarked average block would be invisible to the human eye.

In the second embodiment, the embedding is achieved by a spread spectrum process. In this embodiment, the average mean block $\overline{B}_i$ is first aligned as a (n×n)×1 vector. The initial watermark $W_i$ is shaped to the same n×n length and with gaussian distribution (zero mean value). A small scaled version of $W_i$ is added back to $\overline{B}_i$ to obtain a watermarked average block $\widetilde{B}_i$ in accordance with the following:

$$\widetilde{B}_i = \overline{B}_i \cdot (1 + c W_f), \text{ where } c \text{ is a small constant to control the strength of the watermark.} \quad (16)$$

Finally in step 606, all the image blocks of the cluster are replaced with the watermarked average block $\widetilde{B}_i$ to reconstruct a new image (watermarked image). The cluster criteria is chosen (108) so that the distortion caused by replacing all the image blocks within the cluster with the watermarked average block would be invisible to the human eye.

After the completion of step 606, the watermarked image is outpoured and the process terminates at step 610.

Figure 7:
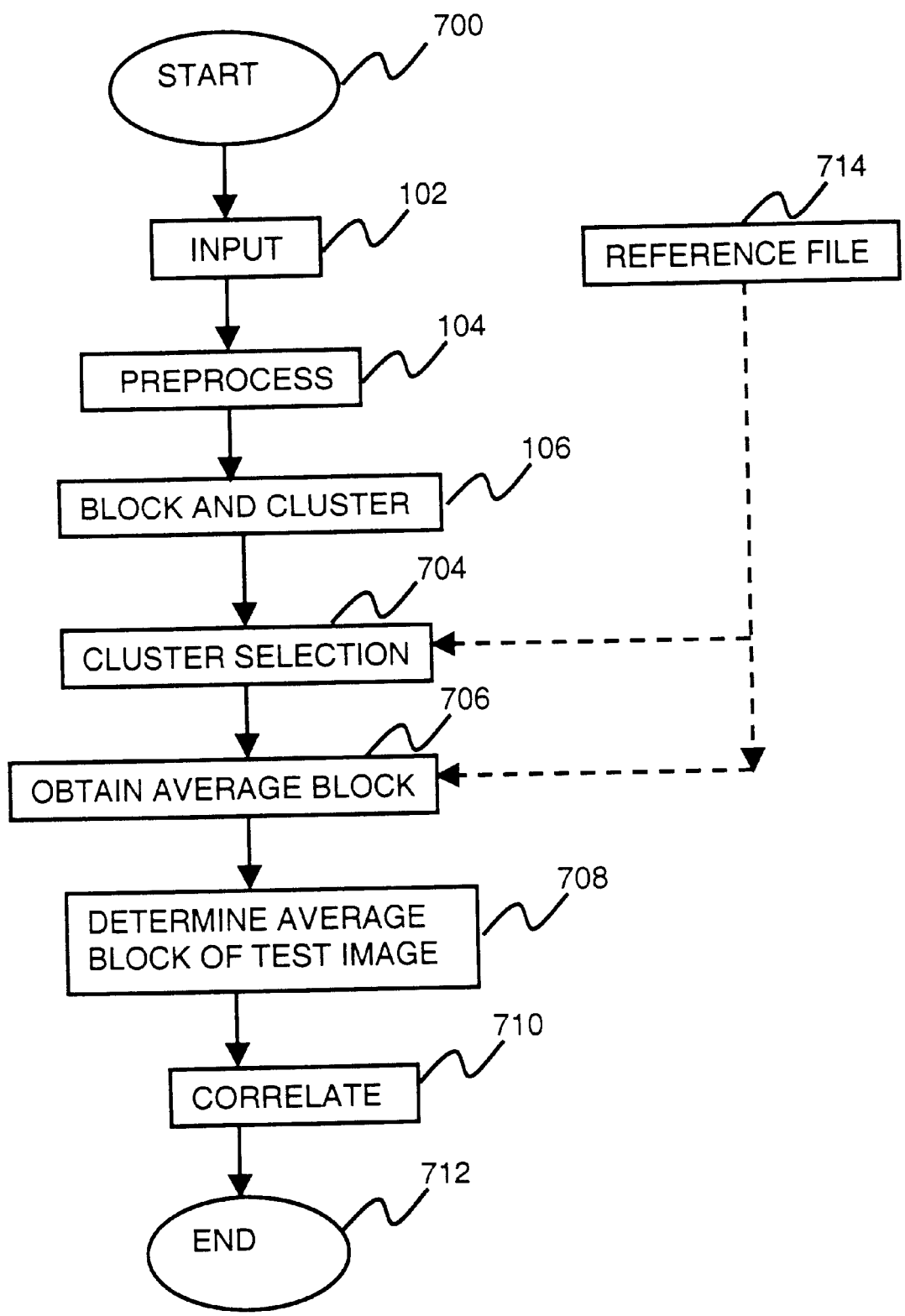
FIG. 7 there is shown a watermark extracting method for extracting a watermark embedded in accordance with the method of FIG. 6.

Turning now to FIG. 7, there is shown a watermark extracting method for extracting a watermark embedded in accordance with the method of FIG. 6. The method commences at step 700, where any necessary parameters are initialised. The test image is then input 102, preprocessed 104 and block and clustered 106 in a similar manner as that of the embedding method of FIG. 6. After completion of step 106, one or more clusters are selected for processing. The clusters selected are determined from information stored in the reference file 714. These clusters correspond to those selected in the embedding method. In the next step 706, the average mean block $\overline{B}_i$ is obtained from the reference file. In this step, the watermark $W_i$ is also generated by the owner's key. The average mean block $\overline{B}_i$ (from the reference file) is then aligned as a (n×n)×1 vector. The watermark $W_i$ is then orthogonalised with respect to $\overline{B}_i$ to obtain the original watermark in accordance with the following:

$$W_o = W_i - (W_i \cdot \breve{B}_i) \breve{B}_i \text{ where}$$

$\breve{B}_i$ is the unit vector along $\overline{B}_i$. (17)

Similarly in the next step 708, a watermarked mean block $\overline{J}_i$ is then obtained from the test image. In the event, the watermark has been embedded by the orthogonal process, then watermarked mean block $\overline{J}_i$ is orthogonalised with respect to $\overline{B}_i$ to obtain another vector $X_i$. Finally in step 710, a correlation is undertaken between $W_i$ and $X_i$ to check whether the watermark exists. In the event, the watermark has been embedded by the spread spectrum process, then the DC component of $\overline{J}_i$ is removed. In this case a correlation is undertaken between $W_i$ and $\overline{J}_i$ to check whether the watermark exists. After the correlation is completed the method terminates at step 712.

In a still further embodiment, the method of embedding and extraction of the second preferred embodiment may include a method of registering and recovering an image as shown in FIGS. 3 and 5. In this way, modifications that may subsequently occur to the embedded image are compensated by normalisation. In a still further embodiment, the first and second preferred embodiments may form part of the same watermarking engine. In the latter embodiment, a user's key is used to select the watermarking method to be used on a particular image. The user's key is an encrypted random key, which is divided into three parts. The first part is used to select the watermarking embedding space (mean block, the transform or vector coefficients), the second is used to select the watermark extraction method (eg. de-orthogonalization or correlation) and the third part is used as the seed to generate the initial watermark $W_i$. In addition, the user's key can be used to select the cluster from the one or more clusters that meet the HVS criteria.

Preferred Embodiment of Apparatus(s)

Figure 8:
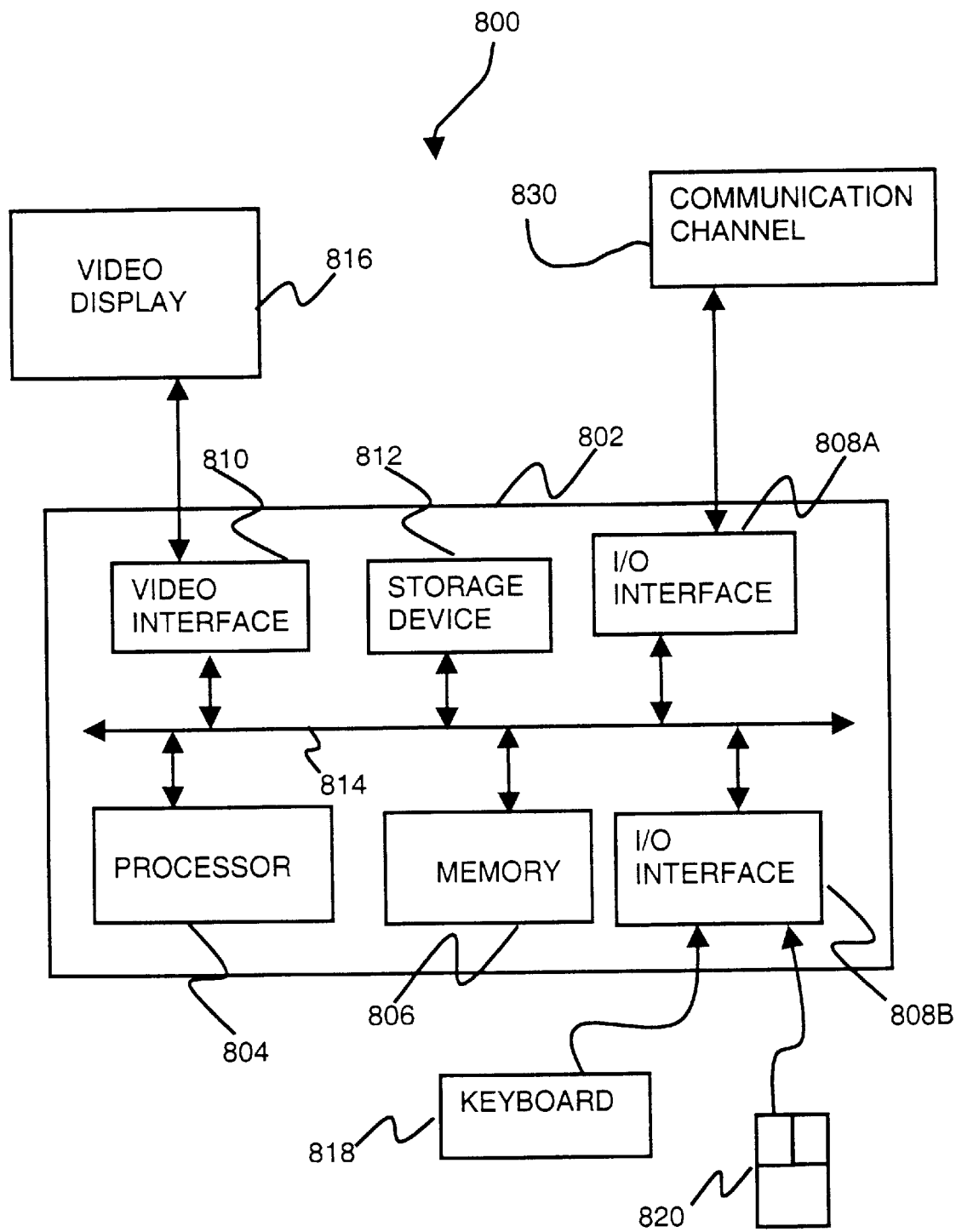
FIG. 8 is a block diagram of a general-purpose computer for implementing the preferred methods of FIGS. 1 to 7.

The methods of FIGS. 1, 3, 4, 5, 6 and 7 is preferably practiced using a conventional general-purpose computer, such as the one shown in FIG. 8 wherein the processes of FIGS. 1, 3, 4, 5, 6 and 7 may be implemented as software executing on the computer. In particular, the steps of methods of embedding and extracting a watermark are effected by instructions in the software that are carried out by the computer. The software may be divided into two separate parts; one part for carrying out the extraction and embedding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for extracting and embedding a watermark in accordance with the embodiments of the invention.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808b using an appropriate communication channel 830 such as a modem communications path, a computer network, or the like. The computer network may include a local area network (LAN), a wide area network (WAN), an Intranet, and/or the Internet The computer 802 itself consists of a central processing unit(s) (simply referred to as a processor hereinafter) 804, a memory 806 which may include random access memory (RAM) and read-only memory (ROM), input/output (IO) interfaces 808a, 808b & 808c, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing are merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812 ), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The foregoing only describes a small number of embodiments of the present invention, however, modifications and/or changes can be made thereto by a person skilled in the art without departing from the scope and spirit of the invention. For example, signal dependent transforms other than KLT transforms may used in the preferred methods. The present embodiments are, therefore, to be considered in all respects to be illustrative and not restrictive.

What is claimed is:

1. A method of embedding digital information in digital multimedia data, wherein said method includes the following steps:

generating one or more transforms from the digital multimedia data or a portion of the digital multimedia data, wherein said transforms are dependent on the digital multimedia data or the portion of the digital multimedia data;

generating transformed digital multimedia data by applying the one or more transforms to the digital multimedia data or the portion of the digital multimedia data;

embedding the digital information in the transformed digital multimedia data; and generating the digital multimedia data embedded with the digital information by applying one or more inverse transforms of the one or more transforms to the embedded transformed digital multimedia data;

wherein said digital multimedia data is an image and said one or more transforms are Karhunen-Loeve transforms and said digital information is embedded in the first $L_i$ coefficients of the transformed digital multimedia data, where the number $L_i$ is determined in accordance with HVS analysis.

2. A method as claimed in claim 1, wherein the method further comprises the following steps for selecting said portion of said digital multimedia data:

partitioning the image into blocks;
clustering the partitioned blocks into classes according to a homogeneity criteria; and selecting one or more of the clusters as said portion of said digital multimedia data in accordance with HVS analysis.

3. A method as claimed in claim 2, wherein the selecting step is determined in accordance with HVS analysis and a user's selection.

4. A method as claimed in claim 1, wherein said digital information is a watermark.

5. A method as claimed in claim 1, wherein said method further includes the following step:

storing the digital multimedia data as a reference file together with associated information.

6. A method as claimed in claim 1, wherein said method further includes the following steps extracting invariant representations of the image;

storing said extracted representations together with associated information in a reference file.

7. A method as claimed in claim 1, wherein said method further includes the following steps extracting key features from said image; and storing the key features together with associated information.

8. A method as claimed in claim 7, wherein said key features include: the positions of the key features, invariant attributes of the key features, maximum and minimum colour values of the image, the size of the image.

9. A method as claimed in claim 1, wherein said digital information is a copyright notice.

10. A method as claimed in claim 1, wherein said digital information is an annotation of said digital multimedia data.

11. A method as claimed in claim 1, wherein said digital information is authentication information verifying said digital multimedia data.

12. A method of embedding digital information in digital multimedia data, wherein said method includes the following steps:

generating one or more transforms from the digital multimedia data or a portion of the digital multimedia data, wherein said transforms are dependent on the digital multimedia data or the portion of the digital multimedia data;

generating transformed digital multimedia data by applying the one or more transforms to the digital multimedia data or the portion of the digital multimedia data;

embedding the digital information in the one or more transforms or their inverses; and generating the digital multimedia data embedded with the digital information by applying one or more embedded inverse transforms to the transformed digital multimedia data.

13. A method as claimed in claim 12, wherein said digital multimedia data is an image.

14. A method as claimed in claim 12, wherein the method further comprises the following steps for selecting said portion of said digital multimedia data: partitioning the image into blocks;

clustering the partitioned blocks into classes according to a homogeneity criteria; and selecting one or more of the clusters as said portion of said digital multimedia data in accordance with HVS analysis.

15. A method as claimed in claim 14, wherein the selecting step is determined in accordance with HVS analysis and a user's selection.

16. A method as claimed in claim 12, wherein said transform is a Karhunen-Loeve transform.

17. A method as claimed in claim 12, wherein said digital multimedia data is an image and said one or more transforms are Karhunen-Loeve transforms and said digital information is embedded in the first $L_i$ eigenvectors of the Karhunen-Loeve transforms, where the number $L_i$ is determined in accordance with HVS analysis.

18. A method as claimed in claim 12, wherein said digital information is a watermark.

19. A method as claimed in claim 12, wherein said method further includes the following step:

storing the digital multimedia data as a reference file together with associated information.

20. A method as claimed in claim 13, wherein said method further includes the following steps extracting invariant representations of the image;

storing said extracted representations together with associated information in a reference file.

21. A method as claimed in claim 13, wherein said method further includes the following steps extracting key features from said image; and storing the key features together with associated information.

22. A method as claimed in claim 21, wherein said key features include: the positions of the key features, invariant attributes of the key features, colour values of the key features, maximum and minimum colour values of the image, the size of the image.

23. A method as claimed in claim 12, wherein said digital information is a copyright notice.

24. A method as claimed in claim 12, wherein said digital information is an annotation of said digital multimedia data.

25. A method as claimed in claim 12, wherein said digital information is authentication information verifying said digital multimedia data.

26. A method of embedding digital information in a digital image, wherein said method includes the following steps:

partitioning the image into blocks of pixels;

clustering the partitioned blocks into classes according to a homogeneity criteria;

selecting one or more of the clusters in accordance with HVS analysis;

generating an associated Karhunen-Loeve (K-L) transform for each selected cluster, wherein the image blocks of each selected cluster are used as a vector population for the purposes of generating the associated K-L transform;

applying the associated K-L transform to the image blocks of the selected cluster to produce corresponding transformed image blocks;

embedding, for each selected cluster, the digital information in the associated K-L transform; and applying, for each selected cluster, an inverse transform of the embedded associated K-L transform to the transformed image blocks of the selected cluster.

27. A method as claimed in claim 26, wherein said digital information is embedded in the first $L_i$ eigenvectors of the Karhunen-Loeve transforms, where the number $L_i$ is determined in accordance with HVS analysis.

28. A method as claimed in claim 26, wherein said digital information is a noise-like watermark.

29. A method as claimed in claim 26, wherein the selecting step is determined in accordance with HVS analysis and a user's selection.

30. A method of embedding digital information in a digital image, wherein said method includes the following steps:

partitioning the image into blocks of pixels;

clustering the partitioned blocks into classes according to a homogeneity criteria;

selecting one or more of the clusters in accordance with HVS analysis;

generating an associated Karhunen-Loeve (K-L) transform for each selected cluster, wherein the image blocks of each selected cluster are used as a vector population for the purposes of generating the associated K-L transform;

applying the associated K-L transform to the image blocks of the selected cluster to produce corresponding transformed image blocks;

embedding, for each selected cluster, the digital information in the selected transformed image blocks; and applying, for each selected cluster, an inverse transform of the associated K-L transform to the embedded transform image blocks of the selected cluster.

31. A method as claimed in claim 30, wherein said digital information is embedded in the first $L_i$ coefficients of the transformed image blocks, where the number $L_i$ is determined in accordance with HVS analysis.

32. A method as claimed in claim 30, wherein said digital information is a noise-like watermark.

33. A method as claimed in claim 30, wherein the selecting step is determined in accordance with HVS analysis and a user's selection.

34. A method of embedding digital information in a digital image, wherein said method includes the following steps:

partitioning the image into blocks of pixels;

clustering the partitioned blocks into classes according to a homogeneity criteria;

selecting one or more of the clusters in accordance with HVS analysis;

generating an associated Karhunen-Loeve (K-L) transform for each selected cluster, wherein the image blocks of each selected cluster are used as a vector population for the purposes of generating the associated K-L transform;

applying the associated K-L transform to the image blocks of the selected cluster to produce corresponding transformed image blocks;

selecting, for each selected cluster, either the associated K-L transform or its corresponding transformed image blocks for embedding;

embedding, for each selected cluster, the digital information in the selected K-L transform or the selected transformed image blocks;

applying, for those selected clusters in which the digital information has been embedded in the associated K-L transform, an inverse transform of the embedded associated K-L transform to the transformed image blocks of the selected cluster; and applying, for those selected clusters in which the digital information has been embedded in the transformed image blocks, an inverse transform of the associated K-L transform to the embedded transform image blocks of the selected cluster.

35. A method as claimed in claim 34, wherein said digital information is embedded in the first $L_i$ eigenvectors of the Karhunen-Loeve transforms, where the number $L_i$ is determined in accordance with HVS analysis.

36. A method as claimed in claim 34, wherein said digital information is embedded in the first $L_i$ coefficients of the transformed image blocks, where the number $L_i$ is determined in accordance with HVS analysis.

37. A method as claimed in claim 34, wherein said digital information is a noise-like watermark.

38. A method as claimed in claim 34, wherein the selecting step is determined in accordance with HVS analysis and a user's selection.

39. A method of embedding digital information in a plurality of images, wherein the images are stored and classified into one or more classes and said method includes the following steps:

generating one or more transforms from the images of said respective one or more classes, wherein said transforms are dependent on the images;

generating transformed images by applying the one or more transforms to the images of said respective one or more classes;

embedding the digital information in the transformed images; and generating the images data embedded with the digital information by applying one or more inverse transforms of the one or more transforms to the embedded transformed images;

wherein said one or more transforms are Karhunen-Loeve transforms and said digital information is embedded in the first $L_i$ coefficients of the transformed digital multimedia data, where the number $L_i$ is determined in accordance with HVS analysis.

40. A method of embedding digital information in a plurality of images, wherein the images are stored and classified into one or more classes and said method includes the following steps:

generating one or more transforms from the images of said respective one or more classes, wherein said transforms are dependent on the images;

generating transformed images by applying the one or more transforms to the images of said respective one or more classes;

embedding the digital information in the one or more transforms or their inverses; and generating the images embedded with the digital information by applying one or more embedded inverse transforms to the transformed images.

41. A method of embedding digital information into video images including a plurality of frames, wherein said method includes the following steps:

extracting one or more key frames from the video images;

generating one or more transforms from the key frames or a part thereof, wherein said transforms are dependent on the key frames or the part thereof;

generating transformed key frames or part thereof by applying the one or more transforms to the key frames or the part thereof;

embedding the digital information in the transformed key frames or part thereof; and generating the key frames or part thereof embedded with the digital information by applying one or more inverse transforms of the one or more transforms to the embedded key frames or part thereof;

wherein said one or more transforms are Karhunen-Loeve transforms and said digital information is embedded in the first $L_i$ coefficients of the transformed digital multimedia data, where the number $L_i$ is determined in accordance with HVS analysis.

42. A method of embedding digital information into video images including a plurality of frames, wherein said method includes the following steps:

extracting one or more key frames from the video images;

generating one or more transforms from the key frames or a part thereof, wherein said transforms are dependent on the key frames or the part thereof;

generating transformed key frames or part thereof by applying the one or more transforms to the key frames or the part thereof;

embedding the digital information in the one or more transforms or their inverses; and generating the key frames or part thereof embedded with the digital information by applying one or more embedded inverse transforms to the transformed key frames or part thereof.

43. A method of modifying a first image in accordance with an image signature, wherein the image signature includes encrypted key points of a second image and their invariant attributes and other aligned global information of the second image and the method includes the steps of:

extracting key points and their invariant attributes from the first image; extracting other global information from the first image;

matching the key points and their invariant attributes and other global information of the first and second images; and normalising the first image based on said matched key points and their invariant attributes and other global information.

44. An apparatus for embedding digital information in digital multimedia data, wherein said apparatus includes:

means for generating one or more transforms from the digital multimedia data or a portion of the digital multimedia data, wherein said transforms are dependent on the digital multimedia data or the portion of the digital multimedia data;

means for generating transformed digital multimedia data by applying the one or more transforms to the digital multimedia data or the portion of the digital multimedia data;

means for embedding the digital information in the transformed digital multimedia data; and means for generating the digital multimedia data embedded with the digital information by applying one or more inverse transforms of the one or more transforms to the embedded transformed digital multimedia data wherein said digital multimedia data is an image and said one or more transforms are Karhunen-Loeve transforms and said digital information is embedded in the first $L_i$ coefficients of the transformed digital multimedia data, where the number $L_i$ is determined in accordance with HVS analysis.

45. An apparatus for embedding digital information in digital multimedia data, wherein said apparatus includes:

means for generating one or more transforms from the digital multimedia data or a portion of the digital multimedia data, wherein said transforms are dependent on the digital multimedia data or the portion of the digital multimedia data;

means for generating transformed digital multimedia data by applying the one or more transforms to the digital multimedia data or the portion of the digital multimedia data;

means for embedding the digital information in the one or more transforms or their inverses; and means for generating the digital multimedia data embedded with the digital information by applying one or more embedded inverse transforms to the transformed digital multimedia data.

46. An apparatus for embedding digital information in a digital image, wherein said apparatus includes:

means for partitioning the image into blocks of pixels;

means for clustering the partitioned blocks into classes according to a homogeneity criteria;

means for selecting one or more of the clusters in accordance with HVS analysis;

means for generating an associated Karhunen-Loeve (K-L) transform for each selected cluster, wherein the image blocks of each selected cluster are used as a vector population for the purposes of generating the associated K-L transform;

means for applying the associated K-L transform to the image blocks of the selected cluster to produce corresponding transformed image blocks.

47. An apparatus for embedding digital information in a digital image, wherein said apparatus includes:

means for partitioning the image into blocks of pixels;

means for clustering the partitioned blocks into classes according to a homogeneity criteria;

means for selecting one or more of the clusters in accordance with HVS analysis;

means for generating an associated Karhunen-Loeve (K-L) transform for each selected cluster, wherein the image blocks of each selected cluster are used as a vector population for the purposes of generating the associated K-L transform;

means for applying the associated K-L transform to the image blocks of the selected cluster to produce corresponding transformed image blocks;

means for embedding, for each selected cluster, the digital information in the selected transformed image blocks; and means for applying, for each selected cluster, an inverse transform of the associated K-L transform to the embedded transform image blocks of the selected cluster.

48. An apparatus for embedding digital information in a digital image, wherein said apparatus includes:

means for partitioning the image into blocks of pixels;

means for clustering the partitioned blocks into classes according to a homogeneity criteria;

means for selecting one or more of the clusters in accordance with HVS analysis;

means for generating an associated Karhunen-Loeve (K-L) transform for each selected cluster, wherein the image blocks of each selected cluster are used as a vector population for the purposes of generating the associated K-L transform;

means for applying the associated K-L transform to the image blocks of the selected cluster to produce corresponding transformed image blocks;

means for selecting, for each selected cluster, either the associated K-L transform or its corresponding transformed image blocks for embedding;

means for embedding, for each selected cluster, the digital information in the selected K-L transform or the selected transformed image blocks;

means for applying, for those selected clusters in which the digital information has been embedded in the associated K-L transform, an inverse transform of the embedded associated K-L transform to the transformed image blocks of the selected cluster; and means for applying, for those selected clusters in which the digital information has been embedded in the transformed image blocks, an inverse transform of the associated K-L transform to the embedded transform image blocks of the selected cluster.

49. An apparatus for embedding digital information in a plurality of images, wherein the images are stored and classified into one or more classes and said apparatus includes:

means for generating one or more transforms from the images of said respective one or more classes, wherein said transforms are dependent on the images;

means for generating transformed images by applying the one or more transforms to the images of said respective one or more classes;

means for embedding the digital information in the one or more transforms or their inverses; and means for generating the images embedded with the digital information by applying one or more embedded inverse transforms to the transformed images.

50. An apparatus for embedding digital information into video images including a plurality of frames, wherein said apparatus includes:

means for extracting one or more key frames from the video images;

means for generating one or more transforms from the key frames or a part thereof, wherein said transforms are dependent on the key frames or the part thereof;

means for generating transformed key frames or part thereof by applying the one or more transforms to the key frames or the part thereof;

means for embedding the digital information in the transformed key frames or part thereof; and means for generating the key frames or part thereof embedded with the digital information by applying one or more inverse transforms of the one or more transforms to the embedded key frames or part thereof;

wherein said one or more transforms are Karhunen-Loeve transforms and said digital information is embedded in the first $L_i$ coefficients of the transformed digital multimedia data, where the number $L_i$ is determined in accordance with HVS analysis.

51. An apparatus for embedding digital information into video images including a plurality of frames, wherein said apparatus includes:

means for extracting one or more key frames from the video images;

means for generating one or more transforms from the key frames or a part thereof, wherein said transforms are dependent on the key frames or the part thereof;

means for generating transformed key frames or part thereof by applying the one or more transforms to the key frames or the part thereof;

means for embedding the digital information in the one or more transforms or their inverses; and means for generating the key frames or part thereof embedded with the digital information by applying one or more embedded inverse transforms to the transformed key frames or part thereof.

52. An apparatus for modifying a first image in accordance with an image signature, wherein the image signature includes encrypted key points of a second image and their invariant attributes and other aligned global information of the second image and the apparatus includes:

means for decrypting the image signature to obtain the key points and their invariant attributes and other global information of the second image;

means for extracting key points and their invariant attributes from the first image;

means for extracting other global information from the first image;

means for matching the key points and their invariant attributes and other global information of the first and second images; and means for normalising the first image based on said matched key points and their invariant attributes and other global information.

53. A computer program product including a computer readable medium having recorded thereon a computer program for embedding digital information in digital multimedia data, wherein said computer program product includes:

means for generating one or more transforms from the digital multimedia data or a portion of the digital multimedia data, wherein said transforms are dependent on the digital multimedia data or the portion of the digital multimedia data;

means for generating transformed digital multimedia data by applying the one or more transforms to the digital multimedia data or the portion of the digital multimedia data;

means for embedding the digital information in the transformed digital multimedia data; and means for generating the digital multimedia data embedded with the digital information by applying one or more inverse transforms of the one or more transforms to the embedded transformed digital multimedia data;

wherein said digital multimedia data is an image and said one or more transforms are Karhunen-Loeve transforms and said digital information is embedded in the first $L_i$ coefficients of the transformed digital multimedia data, where the number $L_i$ is determined in accordance with HVS analysis.

54. A computer program product including a computer readable medium having recorded thereon a computer program for embedding digital information in digital multimedia data, wherein said computer program product includes:

means for generating one or more transforms from the digital multimedia data or a portion of the digital multimedia data, wherein said transforms are dependent on the digital multimedia data or the portion of the digital multimedia data;

means for generating transformed digital multimedia data by applying the one or more transforms to the digital multimedia data or the portion of the digital multimedia data;

means for embedding the digital information in the one or more transforms or their inverses; and means for generating the digital multimedia data embedded with the digital information by applying one or more embedded inverse transforms to the transformed digital multimedia data.

55. A computer program product including a computer readable medium having recorded thereon a computer program for embedding digital information in a digital image, wherein said computer program product includes:

means for partitioning the image into blocks of pixels;

means for clustering the partitioned blocks into classes according to a homogeneity criteria;

means for selecting one or more of the clusters in accordance with HVS analysis;

means for generating an associated Karhunen-Loeve (K-L) transform for each selected cluster, wherein the image blocks of each selected cluster are used as a vector population for the purposes of generating the associated K-L transform;

means for applying the associated K-L transform to the image blocks of the selected cluster to produce corresponding transformed image blocks;

means for embedding, for each selected cluster, the digital information in the associated K-L transform; and means for applying, for each selected cluster, an inverse transform of the embedded associated K-L transform to the transformed image blocks of the selected cluster.

56. A computer program product including a computer readable medium having recorded thereon a computer program for embedding digital information in a digital image, wherein said computer program product includes:

means for partitioning the image into blocks of pixels;

means for clustering the partitioned blocks into classes according to a homogeneity criteria;

means for selecting one or more of the clusters in accordance with HVS analysis;

means for generating an associated Karhunen-Loeve (K-L) transform for each selected cluster, wherein the image blocks of each selected cluster are used as a vector population for the purposes of generating the associated K-L transform;

means for applying the associated K-L transform to the image blocks of the selected cluster to produce corresponding transformed image blocks;

means for embedding, for each selected cluster, the digital information in the selected transformed image blocks; and means for applying, for each selected cluster, an inverse transform of the associated K-L transform to the embedded transform image blocks of the selected cluster.

57. A computer program product including a computer readable medium having recorded thereon a computer program for embedding digital information in a digital image, wherein said computer program product includes:

means for partitioning the image into blocks of pixels;

means for clustering the partitioned blocks into classes according to a homogeneity criteria;

means for selecting one or more of the clusters in accordance with HVS analysis;

means for generating an associated Karhunen-Loeve (K-L) transform for each selected cluster, wherein the image blocks of each selected cluster are used as a vector population for the purposes of generating the associated K-L transform;

means for applying the associated K-L transform to the image blocks of the selected cluster to produce corresponding transformed image blocks;

means for selecting, for each selected cluster, either the associated K-L transform or its corresponding transformed image blocks for embedding;

means for embedding, for each selected cluster, the digital information in the selected K-L transform or the selected transformed image blocks;

means for applying, for those selected clusters in which the digital information has been embedded in the associated K-L transform, an inverse transform of the embedded associated K-L transform to the transformed image blocks of the selected cluster; and means for applying, for those selected clusters in which the digital information has been embedded in the transformed image blocks, an inverse transform of the associated K-L transform to the embedded transform image blocks of the selected cluster.

58. A computer program product including a computer readable medium having recorded thereon a computer program for embedding digital information in a plurality of images, wherein the images are stored and classified into one or more classes and said computer program product includes:

means for generating one or more transforms from the images of said respective one or more classes, wherein said transforms are dependent on the images;

means for generating transformed images by applying the one or more transforms to the images of said respective one or more classes;

means for embedding the digital information in the one or more transforms or their inverses; and means for generating the images embedded with the digital information by applying one or more embedded inverse transforms to the transformed images.

59. A computer program product including a computer readable medium having recorded thereon a computer program for embedding digital information into video images including a plurality of frames, wherein said computer program product includes:

means for extracting one or more key frames from the video images;

means for generating one or more transforms from the key frames or a part thereof, wherein said transforms are dependent on the key frames or the part thereof;

means for generating transformed key frames or part thereof by applying the one or more transforms to the key frames or the part thereof;

means for embedding the digital information in the transformed key frames or part thereof; and means for generating the key frames or part thereof embedded with the digital information by applying one or more inverse transforms of the one or more transforms to the embedded key frames or part thereof;

wherein said one or more transforms are Karhunen-Loeve transforms and said digital information is embedded in the first $L_i$ coefficients of the transformed digital multimedia data, where the number $L_i$ is determined in accordance with HVS analysis.

60. A computer program product including a computer readable medium having recorded thereon a computer program for embedding digital information into video images including a plurality of frames, wherein said computer program product includes:

means for extracting one or more key frames from the video images;

means for generating one or more transforms from the key frames or a part thereof, wherein said transforms are dependent on the key frames or the part thereof;

means for generating transformed key frames or part thereof by applying the one or more transforms to the key frames or the part thereof;

means for embedding the digital information in the one or more transforms or their inverses; and means for generating the key frames or part thereof embedded with the digital information by applying one or more embedded inverse transforms to the transformed key frames or part thereof.

61. A computer program product including a computer readable medium having recorded thereon a computer program for modifying a first image in accordance with an image signature, wherein the image signature includes encrypted key points of a second image and their invariant attributes and other aligned global information of the second image and the computer program product includes:

means for decrypting the image signature to obtain the key points and their invariant attributes and other global information of the second image;

means for extracting key points and their invariant attributes from the first image;

means for extracting other global information from the first image;

means for matching the key points and their invariant attributes and other global information of the first and second images; and means for normalizing the first image based on said matched key points and their invariant attributes and other global information.

62. A method as claimed in claim 34, further comprising registering the image including the following steps:

extracting key points from the image and their invariant attributes;

extracting other global information from the image;

aligning the extracted key points and their invariant attributes with the global information; and encrypting the aligned information to provide an image signature.

63. An apparatus as claimed in claim 48, further comprising means for registering the image including:

means for extricating key points from the image and their invariant attributes;

means for extracting other global information from the image;

means for aligning the extracted key points and their invariant attributes with the global information;

means for encrypting the aligned information to provide an image signature.

64. A computer program product as claimed in claim 56, in which the computer program registers the image and includes:

means for extracting key points from the image and their invariant attributes;

means for extracting other global information from the image;

means for aligning the extracted key points and their invariant attributes with the global information;

means for encrypting the aligned information to provide an image signature.

65. A method as claimed in claim 39, further comprising modifying a first image in accordance with an image signature, wherein the image signature includes encrypted key points of a second image and their invariant attributes and other aligned global information of the second image, wherein said modifying the first image includes the steps of:

decrypting the image signature to obtain the key points and their invariant attributes and other global information of the second image;

extracting key points and their invariant attributes from the first image;

extracting other global information from the first image;

matching the key points and their invariant attributes and other global information of the first and second images; and normalising the first image based on said matched key points and their invariant attributes and other global information.

66. An apparatus as claimed in claim 49, further comprising means for modifying a first image in accordance with an image signature, wherein the image signature includes encrypted key points of a second image and their invariant attributes and other aligned global information of the second image, said means for modifying including:

means for decrypting the image signature to obtain the key points and their invariant attributes and other global information of the second image;

means for extracting key points and their invariant attributes from the first image;

means for extracting other global information from the first image;

means for matching the key points and their invariant attributes and other global information from the first image; and means for normalising the first image based on said matched key points and their invariant attributes and other global information.

67. A computer program product as claimed in claim 60, including:

means for modifying the image in accordance with the image signature; wherein the image signature includes encrypted key points of a second image and their invariant attributes and other aligned global information of the second image, said means for modifying including:

means for decrypting the image signature to obtain the key points and their invariant attributes and other global information of the second image;

means for extracting key points and their invariant attributes from the first image;

means for extracting other global information from the first image;

means for matching the key points and their invariant attributes and other global information of the first image based on said matched key points and their invariant attributes and other global information.

68. A method as claimed in claim 12, further comprising: extracting digital information from first digital multimedia data having embedded therein said digital information including the following steps:

deriving one or more embedded transforms from a reference file, wherein said embedded transforms are dependent on second digital multimedia data or a portion thereof;

deriving transformed digital multimedia data from the reference file, wherein said transformed digital multimedia data is dependent on the second digital multimedia data or a portion thereof;

generating transformed digital multimedia data by applying one or more of the derived embedded transforms to the first digital multimedia data or a portion thereof; and correlating the generated transformed digital multimedia with the derived transformed digital multimedia to check whether the digital information embedded in the first multimedia data is the same as that derived from the reference file.

69. A method as claimed in claim 12, further comprising extracting digital information from first digital multimedia data having embedded therein said digital information, including the following steps:

deriving one or more transforms from a reference file, wherein said transforms are dependent on second digital multimedia data or a portion thereof;

deriving transformed digital multimedia data from the reference file, wherein said transformed digital multimedia data is dependent on the second digital multimedia data or a portion thereof;

generating embedded transformed digital multimedia data by applying one or more of the derived embedded transforms to the first digital multimedia data or a portion thereof; and correlating the generated embedded transformed digital multimedia with the derived transformed digital multimedia so as to extract the digital information.

70. An apparatus as claimed in claim 49, further comprising means for extracting digital information from first digital multimedia data having embedded therein said digital information, including:

means for deriving one or more embedded transforms from a reference file, wherein said embedded transforms are dependent on second digital multimedia data or a portion thereof;

means for deriving transformed digital multimedia data from the reference file, wherein said transformed digital multimedia data is dependent on the second digital multimedia data or a portion thereof;

means for generating transformed digital multimedia data by applying one or more of the derived embedded transforms to the first digital multimedia data or a portion thereof; and means for correlating the generated transformed digital multimedia with the derived transformed digital multimedia to check whether the digital information embedded in the first multimedia data is the same as that derived from the reference file.

71. A computer program product as claimed in claim 60, including means extracting digital information from first digital multimedia data having embedded therein said digital information, including:

means for deriving one or more embedded transforms from a reference file, wherein said embedded transforms are dependent on second digital multimedia data or a portion thereof;

means for deriving transformed digital multimedia data from the reference file, wherein said transformed digital multimedia data is dependent on the second digital multimedia data or a portion thereof;

means for generating transformed digital multimedia data by applying one or more of the derived embedded transforms to the first digital multimedia data or a portion thereof; and means for correlating the generated transformed digital multimedia with the derived transformed digital multimedia to check whether the digital information embedded in the first multimedia data is the same as that derived from the reference file, having embedded therein said digital information, wherein said computer program product includes:

means for partitioning the image into blocks of pixels;

means for clustering the partitioned blocks into classes according to a homogeneity criteria;

means for selecting one or more of the clusters in accordance with information obtained from a reference file;

means for retrieving, for each selected cluster, an average block of pixels stored in the reference file;

means for averaging, for each selected cluster, the blocks of pixels of the image; and means for correlating, for each selected pixel, the averaged blocks of the image with the retrieved blocks to determine whether a watermark exists.

72. A method of embedding digital information in a plurality of images, wherein the images are stored and classified into one or more classes and said method includes the following steps:

generating one or more transforms from the images of said respective one or more classes, wherein said transforms are dependent on the images; generating transformed images by applying the one or more transforms to the images of said respective one or more classes;

embedding the digital information in the transformed images;

generating the images data embedded with the digital information by applying one or more inverse transforms of the one or more transforms to the embedded transformed images; and modifying a first image in accordance with an image signature, wherein the image signature includes encrypted key points of a second image and their invariant attributes and other aligned global information of the second image, wherein said modifying the first image includes the steps of:

decrypting the image signature to obtain the key points and their invariant attributes and other global information of the second image;

extracting key points and their invariant attributes from the first image; extracting other global information from the first image;

matching the key points and their invariant attributes and other global information of the first and second images; and normalising the first image based on said matched key points and their invariant attributes and other global information.

\* \* \* \* \*